(12) United States Patent
Chen et al.

(10) Patent No.: US 10,692,413 B2
(45) Date of Patent: Jun. 23, 2020

(54) DISPLAY DEVICE

(71) Applicant: QISDA CORPORATION, Taoyuan (TW)

(72) Inventors: Chun-Jung Chen, Taoyuan (TW); Yung-Yeh Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/554,573

(22) Filed: Aug. 28, 2019

(65) Prior Publication Data

US 2020/0074903 A1 Mar. 5, 2020

(30) Foreign Application Priority Data

Sep. 3, 2018 (TW) ................................. 107130891

(51) Int. Cl.
*H04N 9/28* (2006.01)
*H04N 17/04* (2006.01)
*H04N 9/31* (2006.01)
*G09G 3/00* (2006.01)
*H01R 11/30* (2006.01)
(Continued)

(52) U.S. Cl.
CPC .............. *G09G 3/006* (2013.01); *G01J 3/506* (2013.01); *H01R 11/30* (2013.01); *G02F 1/133308* (2013.01); *G09G 2320/0666* (2013.01); *G09G 2320/0693* (2013.01)

(58) Field of Classification Search
CPC ............ H04N 9/28; H04N 17/04; H04N 9/31; H04N 9/3185; G09G 2320/0666; G09G 2320/0693; G09G 3/006; G01J 3/506; G02F 1/133308; H01R 11/30

USPC ....... 348/177, 191, 189, 745–747, 791, 806, 348/807; 345/690; 361/679.27
See application file for complete search history.

(56) References Cited

U.S. PATENT DOCUMENTS

2005/0157298 A1* 7/2005 Evanicky ............... G09G 3/006
348/191
2007/0195209 A1* 8/2007 Cheng .................. H04N 9/3182
348/745
(Continued)

FOREIGN PATENT DOCUMENTS

| CN | 104766559 A | 7/2015 |
| CN | 207382527 U | 5/2018 |

(Continued)

*Primary Examiner* — Sherrie Hsia

(57) ABSTRACT

A display device includes a display module and a color calibrator. The display module includes a first casing and a circuit board. The first casing has a positioning recess and an accommodating recess. The circuit board has a first electrical connecting portion. The circuit board is disposed corresponding to the positioning recess and the first electrical connecting portion is exposed from the positioning recess. The color calibrator includes a second casing, a second electrical connecting portion and a sensor. The second casing has a protruding portion. The color calibrator is selectively accommodated in the accommodating recess or connected to the positioning recess by the protruding portion. When the protruding portion of the color calibrator is connected to the positioning recess, the first electrical connecting portion is electrically connected to the second electrical connecting portion and the sensor faces a display area of the display module.

14 Claims, 10 Drawing Sheets

(51) Int. Cl.
*G01J 3/50* (2006.01)
*G02F 1/1333* (2006.01)

(56) References Cited

U.S. PATENT DOCUMENTS

2009/0160878 A1* 6/2009 Kwong .................... G09G 5/00
345/690
2013/0169700 A1* 7/2013 Park ........................ G01J 3/506
345/690

FOREIGN PATENT DOCUMENTS

| TW | 201632848 A | 9/2016 |
| TW | 201704647 A | 2/2017 |

* cited by examiner

DISPLAY DEVICE

BACKGROUND OF THE INVENTION

1. Field of the Invention

The invention relates to a display device and, more particularly, to a display device with a color calibrator capable of being stored or used conveniently.

2. Description of the Prior Art

A color calibrator utilizes a colorimeter to detect a color error of a display device and then generates a setting profile for modifying the color error. As long as the setting profile is applied to the display device, the display device can display colors close to standard. At present, the color calibrator is usually installed in the display device and controlled to move by means of a motor or other connecting structures. Since the motor or other connecting structures have large size, it needs to occupy much space and may affect the appearance of the display device. Furthermore, it is inconvenient to maintain the motor or other connecting structures and the cost is high.

SUMMARY OF THE INVENTION

An objective of the invention is to provide a display device with a color calibrator capable of being stored or used conveniently, so as to solve the aforesaid problems.

According to an embodiment of the invention, a display device comprises a display module and a color calibrator. The display module comprises a first casing and a circuit board. The first casing has a positioning recess and an accommodating recess, wherein the positioning recess and the accommodating recess are located at two adjacent sides of the first casing. The circuit board has a first electrical connecting portion. The circuit board is disposed corresponding to the positioning recess and the first electrical connecting portion is exposed from the positioning recess. The color calibrator comprises a second casing, a second electrical connecting portion and a sensor. A first end of the second casing has a protruding portion. The second electrical connecting portion is disposed corresponding to the protruding portion. The sensor is disposed at a second end of the second casing and electrically connected to the second electrical connecting portion. The color calibrator is selectively accommodated in the accommodating recess or connected to the positioning recess by the protruding portion. When the protruding portion of the color calibrator is connected to the positioning recess, the first electrical connecting portion is electrically connected to the second electrical connecting portion and the sensor faces a display area of the display module.

According to another embodiment of the invention, a display device comprises a display module, a support frame and a color calibrator. The display module comprises a first casing and a circuit board. The first casing has a positioning recess. The circuit board has a first electrical connecting portion. The circuit board is disposed corresponding to the positioning recess and the first electrical connecting portion is exposed from the positioning recess. The support frame is connected to the display module. One of the first casing and the support frame has an accommodating recess. The color calibrator comprises a second casing, a second electrical connecting portion and a sensor. A first end of the second casing has a protruding portion. The second electrical connecting portion is disposed corresponding to the protruding portion. The sensor is disposed at a second end of the second casing and electrically connected to the second electrical connecting portion. The color calibrator is selectively accommodated in the accommodating recess or connected to the positioning recess by the protruding portion. When the protruding portion of the color calibrator is connected to the positioning recess, the first electrical connecting portion is electrically connected to the second electrical connecting portion and the sensor faces a display area of the display module.

As mentioned in the above, a user may connect the protruding portion of the color calibrator to the positioning recess of the display module, so as to use the color calibrator to perform color calibration for the display area of the display module. By means of the cooperation between the protruding portion of the color calibrator and the positioning recess of the display module, the color calibrator can be positioned easily and the sensor does not tilt. After using the color calibrator, the user may accommodate the color calibrator in the accommodating recess of the display module or the support frame for storage, so as to prevent the color calibrator from being lost in storage alone. Furthermore, the invention does not need to dispose the motor of the prior art, such that the required component is less, the maintenance is more convenient, and the cost is lower for the invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
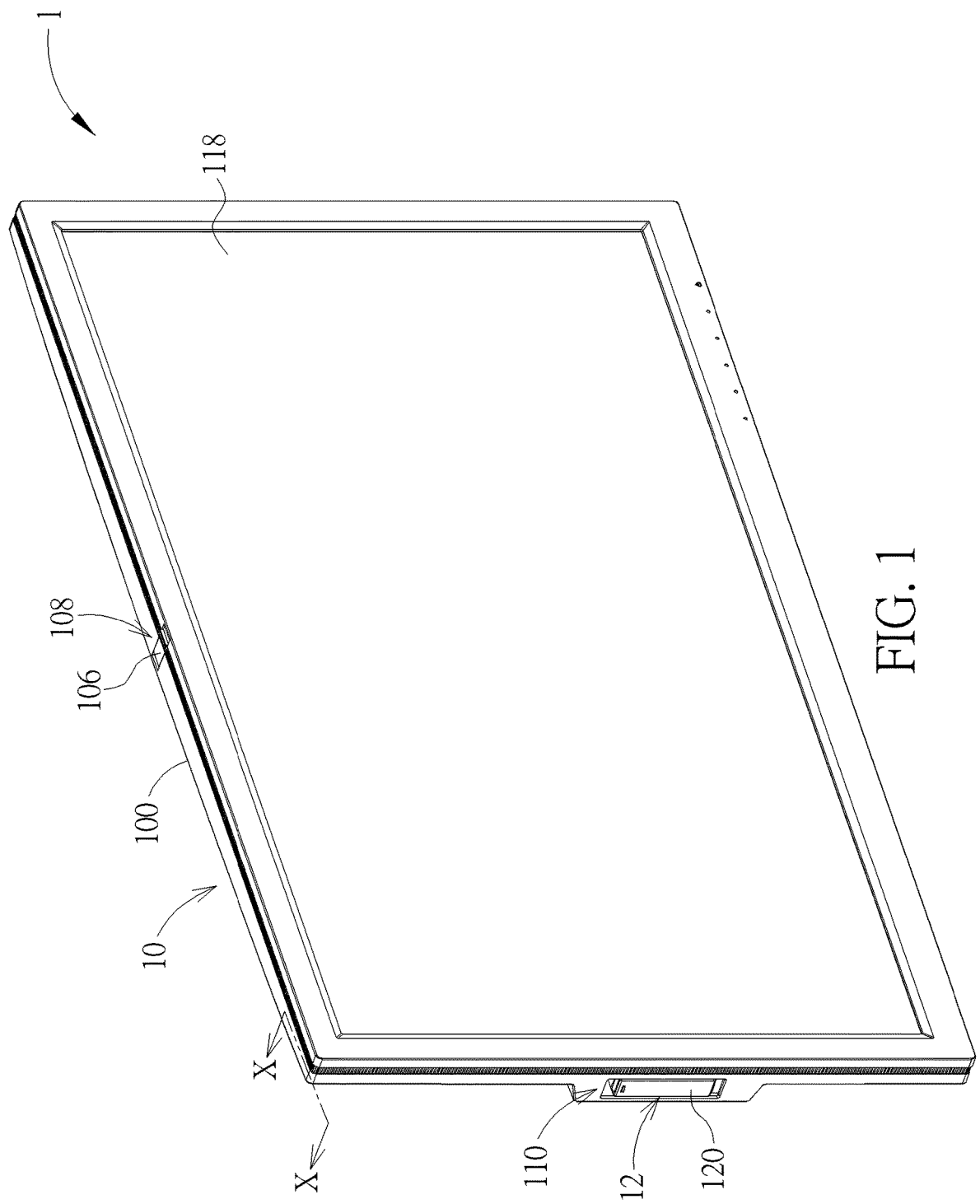
FIG. 1 is a perspective view illustrating a display device according to an embodiment of the invention, wherein a color calibrator is accommodated in an accommodating recess of a display module.
Figure 2:
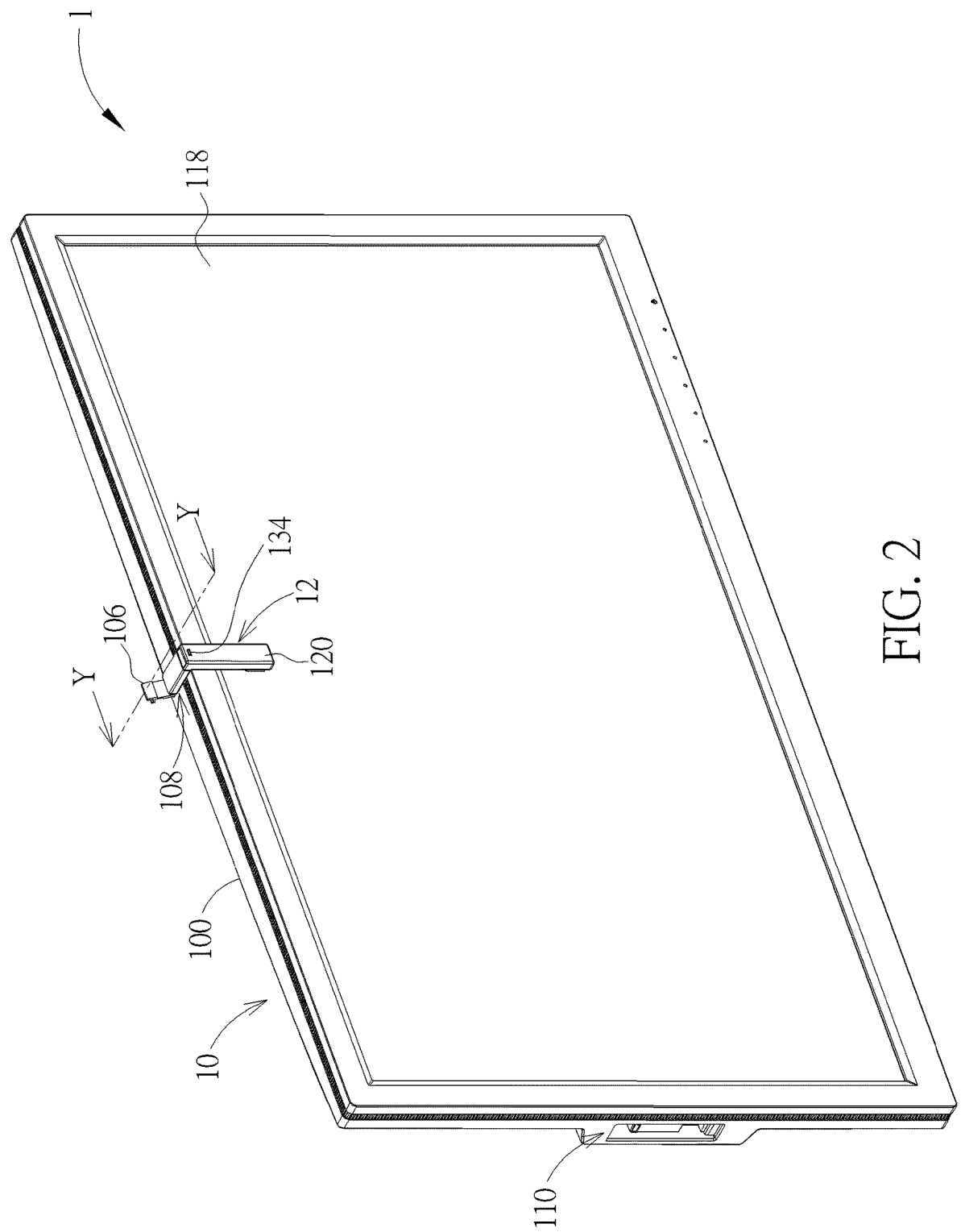
FIG. 2 is a perspective view illustrating the color calibrator shown in FIG. 1 being hung on the display module.
Figure 3:
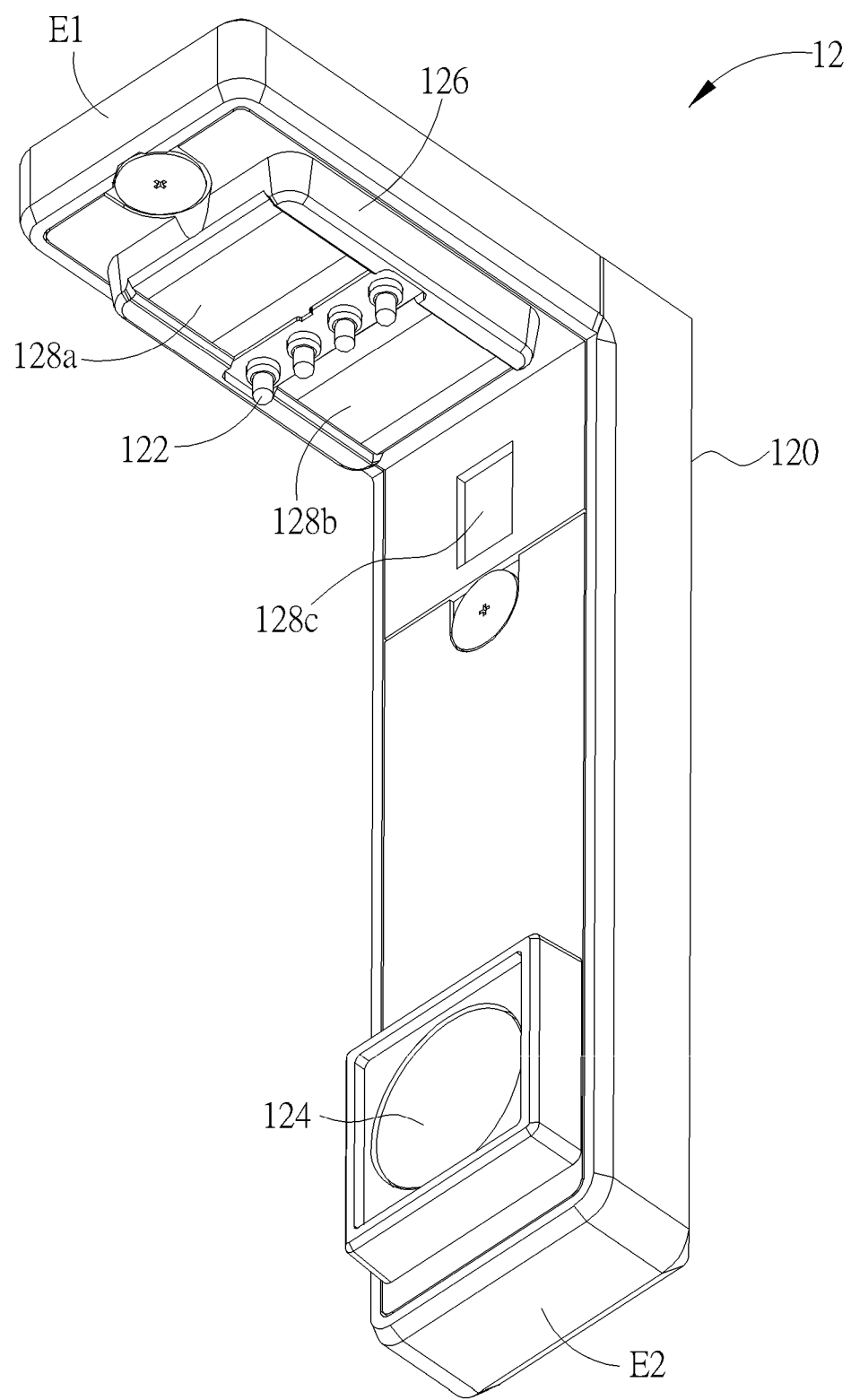
FIG. 3 is a perspective view illustrating the color calibrator shown in FIG. 1 from another viewing angle.
Figure 4:
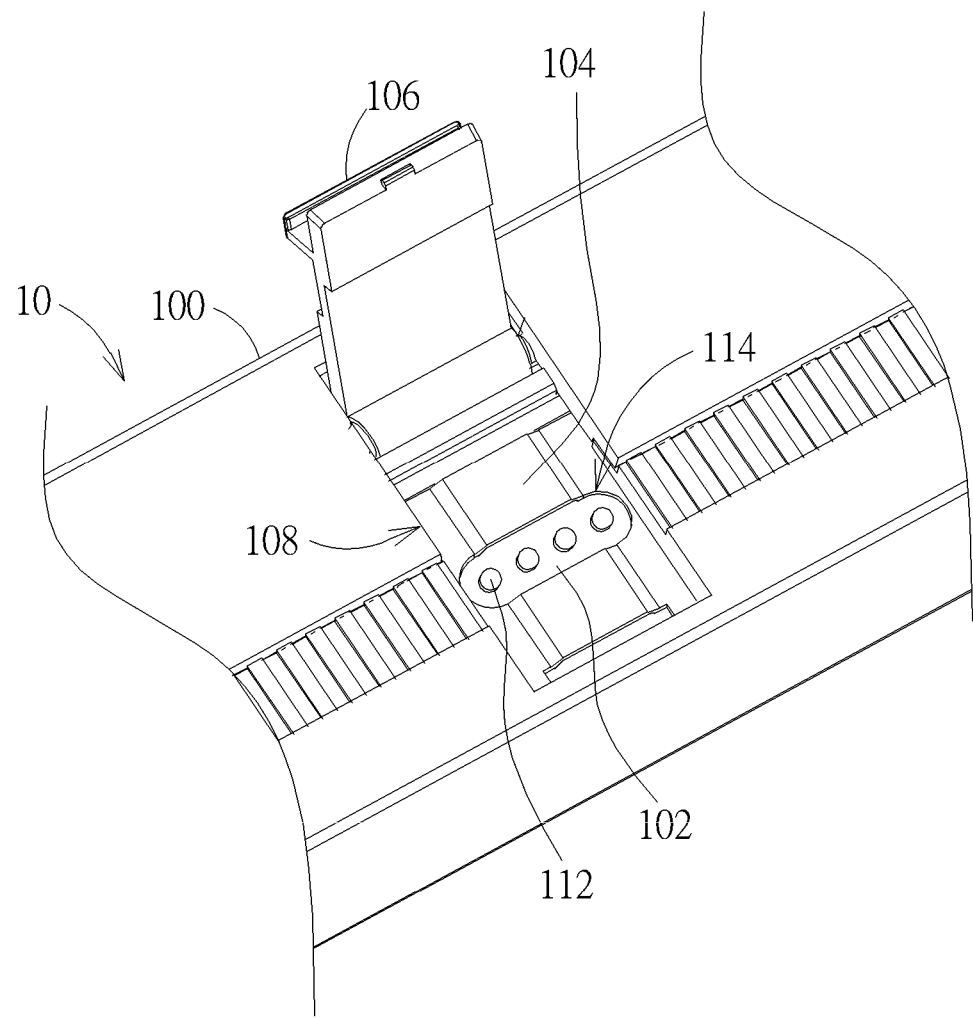
FIG. 4 is a partial perspective view illustrating the cover shown in FIG. 1 being opened.
Figure 5:
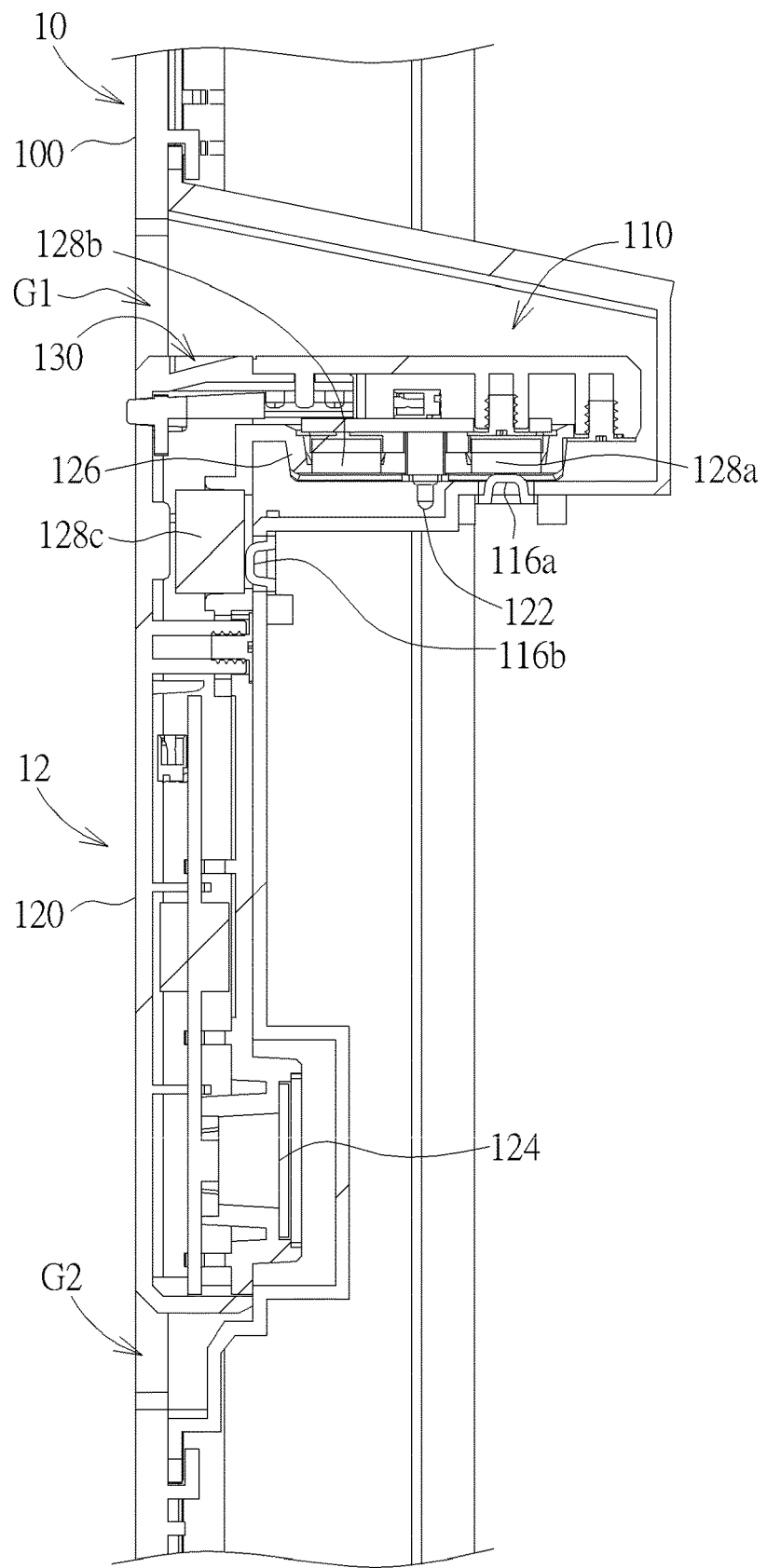
FIG. 5 is a partial sectional view illustrating the display device shown in FIG. 1 along line X-X.
Figure 6:
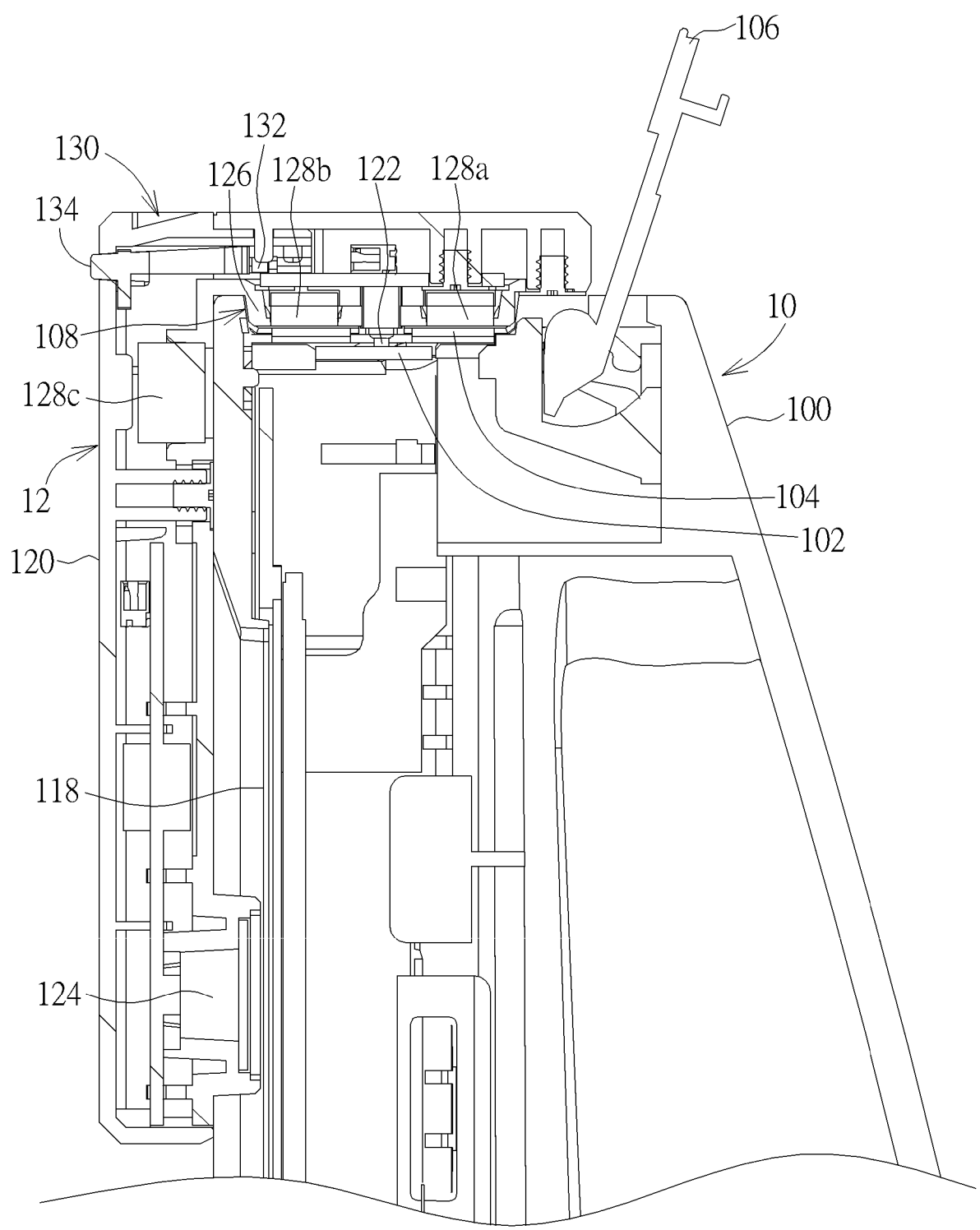
FIG. 6 is a partial sectional view illustrating the display device shown in FIG. 2 along line Y-Y.

Referring to FIGS. 1 to 6, FIG. 1 is a perspective view illustrating a display device 1 according to an embodiment of the invention, wherein a color calibrator 12 is accommodated in an accommodating recess 110 of a display module 10, FIG. 2 is a perspective view illustrating the color calibrator 12 shown in FIG. 1 being hung on the display module 10, FIG. 3 is a perspective view illustrating the color calibrator 12 shown in FIG. 1 from another viewing angle, FIG. 4 is a partial perspective view illustrating the cover 106 shown in FIG. 1 being opened, FIG. 5 is a partial sectional view illustrating the display device 1 shown in FIG. 1 along line X-X, and FIG. 6 is a partial sectional view illustrating the display device 1 shown in FIG. 2 along line Y-Y.

As shown in FIGS. 1 to 6, the display device 1 comprises a display module 10 and a color calibrator 12. In this embodiment, the display module 10 may be a liquid crystal display module, an organic light emitting diode display module, a plasma display module or other display modules according to practical applications. The color calibrator 12 is configured to detect a color error of the display module 10 and then generates a setting profile for the display module 10 to modify the color error.

The display module 10 comprises a first casing 100, a circuit board 102, a first magnetic member 104 and a cover 106. The first casing 100 has a positioning recess 108 and an accommodating recess 110. In this embodiment, the positioning recess 108 and the accommodating recess 110 are located at two adjacent sides of the first casing 100. In another embodiment, the positioning recess 108 and the accommodating recess 110 may be located at an identical side or opposite sides of the first casing 100 according to practical applications.

The cover 106 is configured to cover the positioning recess 108. In this embodiment, the cover 106 may be pivotally connected to a side of the positioning recess 108, such that a user may open or close the cover 106 with respect to the positioning recess 108 in a rotatable manner. In another embodiment, the cover 106 may be detachably disposed in the positioning recess 108 according to practical applications. As shown in FIG. 4, the circuit board 102 and the first magnetic member 104 are disposed in the first casing 100 and correspond to the positioning recess 108. The circuit board 102 has a first electrical connecting portion 112. When the cover 106 is opened with respect to the positioning recess 108, the first electrical connecting portion 112 is exposed from the positioning recess 108. In this embodiment, since the circuit board 102 is located below the first magnetic member 104, a slot 114 may be formed on the first magnetic member 104, such that the first electrical connecting portion 112 is exposed from the positioning recess 108 through the slot 114. It should be noted that if the first magnetic member 104 does not cover the first electrical connecting portion 112 of the circuit board 102, the invention does not need to form the slot 114 on the first magnetic member 104. In this embodiment, the first magnetic member 104 may be, but not limited to, an iron member.

As shown in FIG. 3, the color calibrator 12 comprises a second casing 120, a second electrical connecting portion 122 and a sensor 124. A first end E1 of the second casing 120 has a protruding portion 126 and the sensor 124 is disposed at a second end E2 of the second casing 120, wherein the first end E1 and the second end E2 may form an L-shape. The second electrical connecting portion 122 is disposed in the second casing 120, corresponds to the protruding portion 126, and is exposed. In this embodiment, the sensor 124 maybe electrically connected to the second electrical connecting portion 122 through a circuit layout in the color calibrator 12. The sensor 124 may be a colorimeter or other sensors capable of sensing light. The second electrical connecting portion 122 may be, but not limited to, a pogo pin.

Furthermore, the color calibrator 12 may further comprise three second magnetic members 128a, 128b, 128c, wherein the second magnetic members 128a, 128b, 128c are disposed in the second casing 120 and correspond to the protruding portion 126. In this embodiment, the second magnetic members 128a, 128b, 128c may be disposed at two adjacent sides of the second casing 120 and the second magnetic members 128a, 128b, 128c may be, but not limited to, magnets. It should be noted that the number and position of the second magnetic members may be determined according to practical applications, so the invention is not limited to the embodiment shown in the figures.

The color calibrator 12 maybe selectively accommodated in the accommodating recess 110 of the display module 10 or connected to the positioning recess 108 of the display module 10 by the protruding portion 126. As shown in FIG. 1, a user may accommodate the color calibrator 12 in the accommodating recess 110 of the display module 10 for storage, so as to prevent the color calibrator 12 from being lost in storage alone. As shown in FIG. 5, the accommodating recess 110 may have two third magnetic members 116a, 116b. In this embodiment, the third magnetic members 116a, 116b may be, but not limited to, iron members. The positions of the third magnetic members 116a, 116b correspond to the second magnetic members 128a, 128c. Accordingly, when the color calibrator 12 is accommodated in the accommodating recess 110, the third magnetic members 116a, 116b and the second magnetic members 128a, 128c attract each other, so as to position the color calibrator 12 in the accommodating recess 110. It should be noted that the number and position of the third magnetic members may be determined according to the number and position of the second magnetic members, so the invention is not limited to the embodiment shown in the figures.

When the user wants to use the color calibrator 12 to perform color calibration for a display area 118 of the display module 10, the user may take the color calibrator 12 out of the accommodating recess 110 of the display module 10. In this embodiment, the second casing 120 of the color calibrator 12 may have a recess 130, as shown in FIG. 5. Furthermore, when the color calibrator 12 is accommodated in the accommodating recess 110 of the display module 10, there are gaps G1, G2 above and below the color calibrator 12. Accordingly, the user may insert fingers into the gaps G1, G2 and pull the recess 130 to take the color calibrator 12 out of the accommodating recess 110 of the display module 10.

Then, the user may insert the protruding portion 126 of the color calibrator 12 into the positioning recess 108 of the display module 10, so as to connect the protruding portion 126 of the color calibrator 12 to the positioning recess 108 of the display module 10. In this embodiment, the positioning recess 108 is located at a top side of the display module 10, so the color calibrator 12 is hung on the top side of the display module 10. When the protruding portion 126 of the color calibrator 12 is connected to the positioning recess 108 of the display module 10, the first electrical connecting portion 112 of the circuit board 102 of the display module 10 is electrically connected to the second electrical connecting portion 122 of the color calibrator 12 and the sensor 124 of the color calibrator 12 faces the display area 118 of the display module 10. Accordingly, the color calibrator 12 can perform color calibration for the display area 108 of the display module 10.

In this embodiment, the shape of the protruding portion 126 of the color calibrator 12 corresponds to the shape of the positioning recess 108 of the display module 10. Preferably, the protruding portion 126 of the color calibrator 12 may be engaged with the positioning recess 108 of the display module 10 in a tight-fitting manner to position the color calibrator 12 at a position shown in FIG. 2, such that the sensor 124 does not tilt. Furthermore, when the protruding portion 126 of the color calibrator 12 is connected to the positioning recess 108 of the display module 10, the first magnetic member 104 of the display module 10 and the second magnetic members 128a, 128b attract each other to position the color calibrator 12 more stably. Moreover, the second magnetic member 128c may attract an iron member in the display module 10 correspondingly to position the color calibrator 12 more stably.

As shown in FIG. 6, the color calibrator 12 may further comprise a light emitting unit 132. The light emitting unit 132 is disposed in the second casing 120 and electrically connected to the second electrical connecting portion 122. Furthermore, the second casing 120 has a light transmissive portion 134, wherein the light transmissive portion 134 is disposed on a light emitting path of the light emitting unit 132. When the first electrical connecting portion 112 of the circuit board 102 of the display module 10 is electrically connected to the second electrical connecting portion 122 of the color calibrator 12, the light emitting unit 132 emits a light and the light is projected out of the second casing 120 through the light transmissive portion 134, such that the user may confirm that the color calibrator 12 has been assembled correctly through the light. In this embodiment, the light emitting unit 132 may be, but not limited to, a light emitting diode and the light transmissive portion 134 may be, but not limited to, a light transmissive plastic member.

Figure 7:
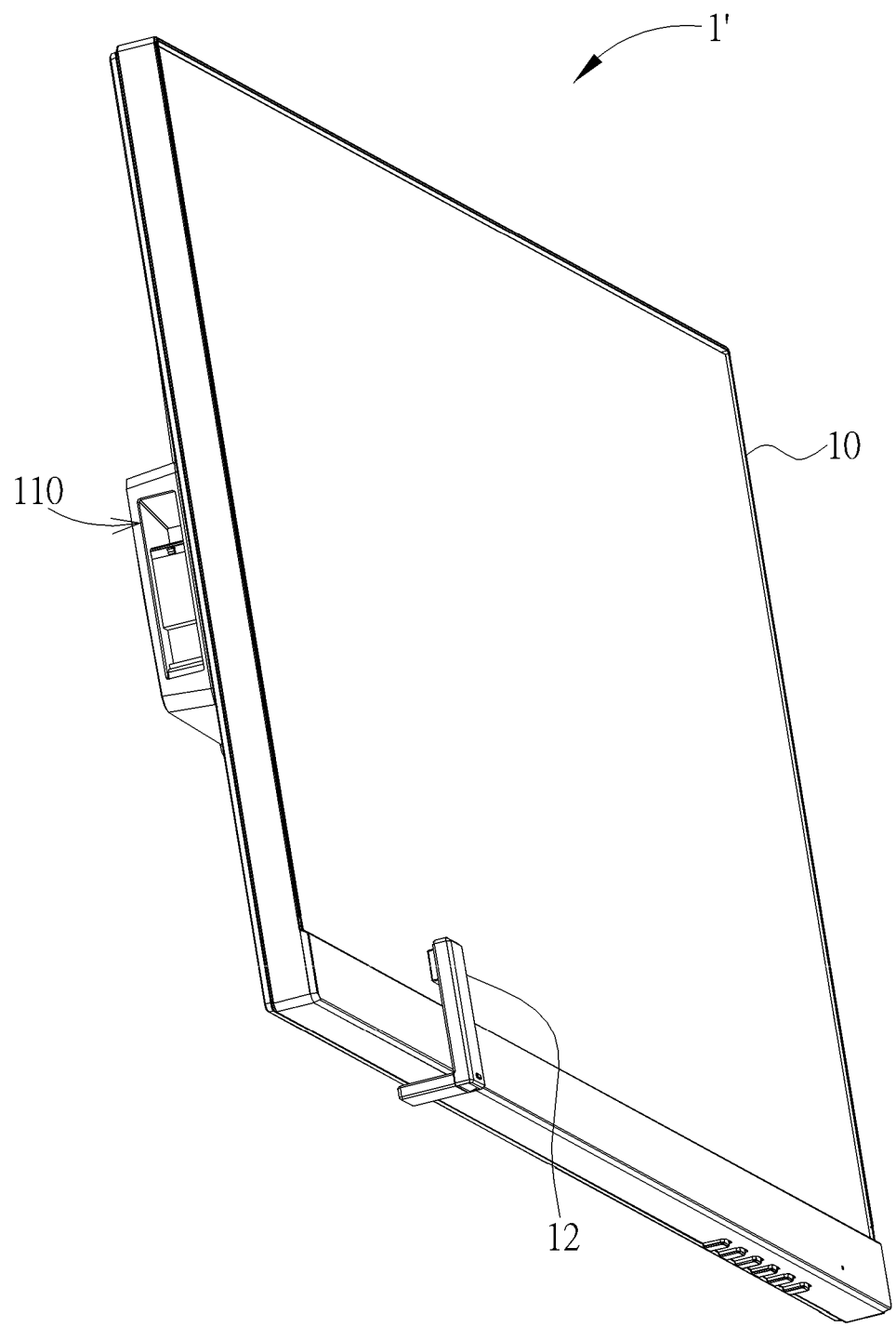
FIG. 7 is a perspective view illustrating a display device according to another embodiment of the invention.
Figure 8:
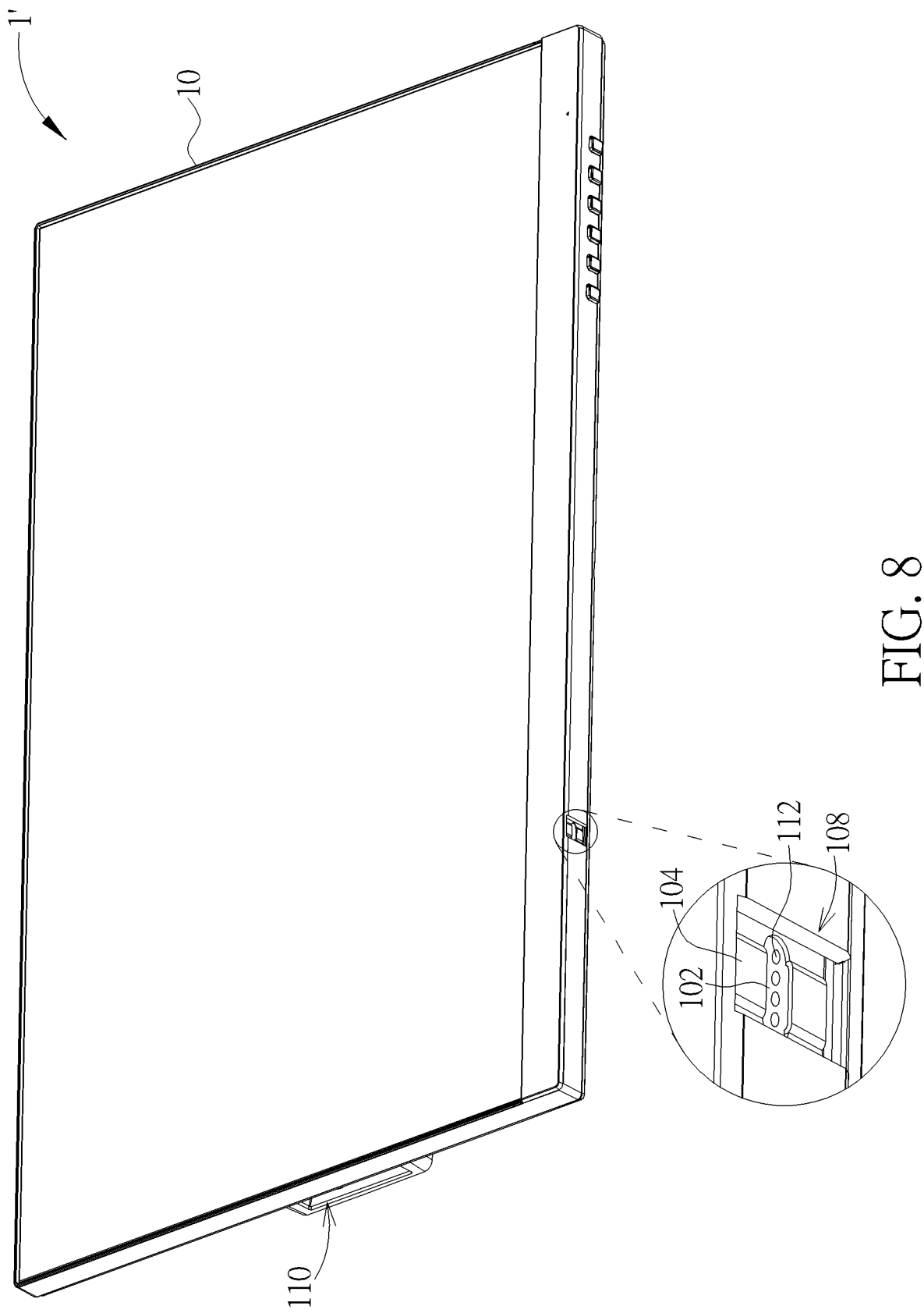
FIG. 8 is a perspective view illustrating the display module shown in FIG. 7 from another viewing angle.

Referring to FIGS. 7 and 8, FIG. 7 is a perspective view illustrating a display device 1' according to another embodiment of the invention and FIG. 8 is a perspective view illustrating the display module 10 shown in FIG. 7 from another viewing angle. The main difference between the display device 1' and the aforesaid display device 1 is that the positioning recess 108 of the display device 1' is located at a bottom side of the display module 10, as shown in FIG. 8. Accordingly, the color calibrator 12 is hung on the bottom side of the display module 10, as shown in FIG. 7. Since the positioning recess 108 is located at the bottom side of the display module 10, the circuit board 102 and the first magnetic member 104 are disposed at the bottom side of the display module 10 and correspond to the positioning recess 108. Accordingly, the display module 10 may be applied to an edge-to-edge design.

Figure 9:
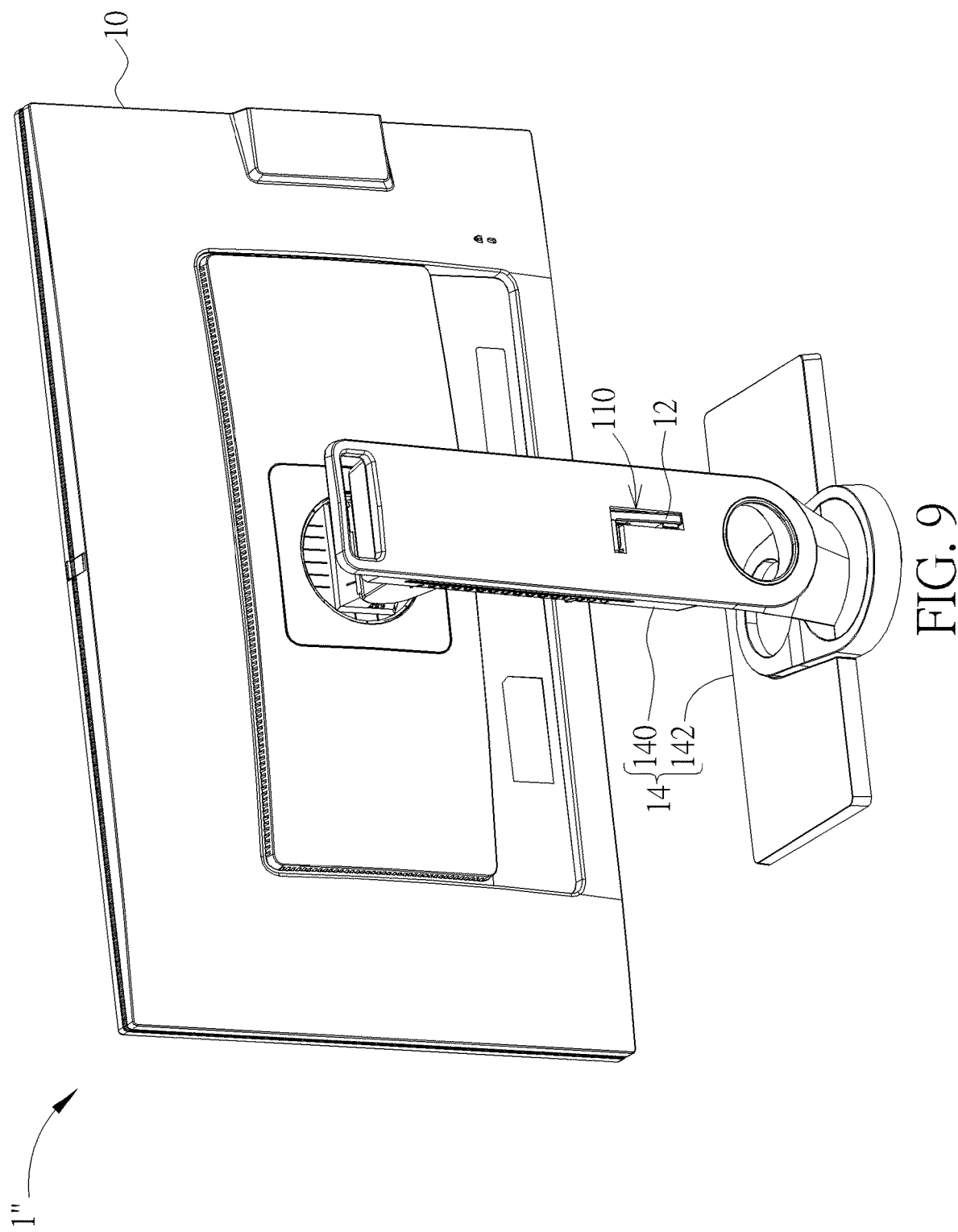
FIG. 9 is a perspective view illustrating a display device according to another embodiment of the invention.

Referring to FIG. 9, FIG. 9 is a perspective view illustrating a display device 1" according to another embodiment of the invention. The main difference between the display device 1' and the aforesaid display device 1 is that the display device 1" further comprises a support frame 14 connected to the display module 10. As shown in FIG. 9, the support frame 14 may comprise a frame body 140 and a base 142. In this embodiment, the frame body 140 of the support frame 14 may have the aforesaid accommodating recess 110. Accordingly, the user may accommodate the color calibrator 12 in the accommodating recess 110 of the frame body 140 for storage.

Figure 10:
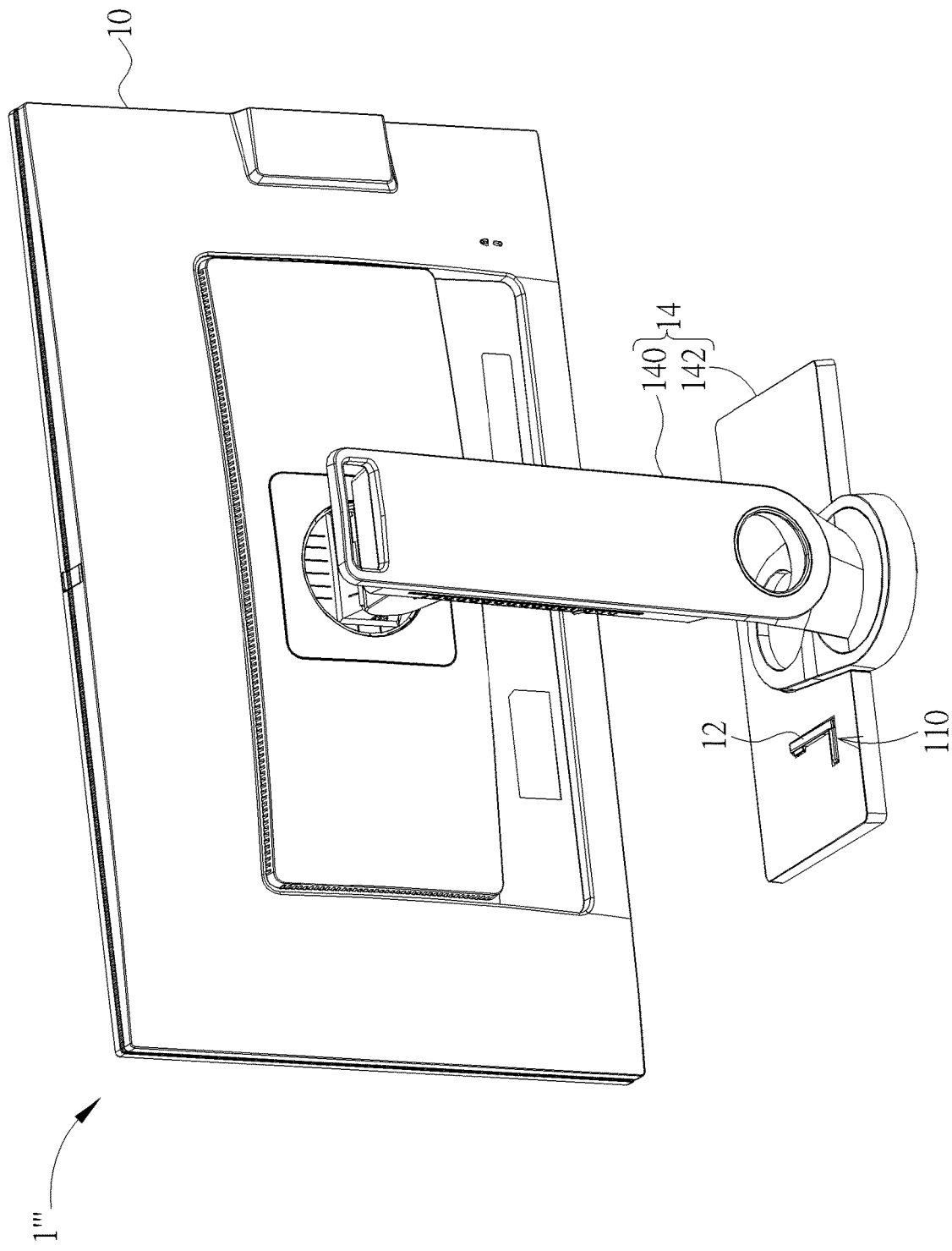
FIG. 10 is a perspective view illustrating a display device according to another embodiment of the invention.

Referring to FIG. 10, FIG. 10 is a perspective view illustrating a display device 1''' according to another embodiment of the invention. The main difference between the display device 1''' and the aforesaid display device 1" is that the base 142 of the support frame 14 of the display device 1''' may have the aforesaid accommodating recess 110. Accordingly, the user may accommodate the color calibrator 12 in the accommodating recess 110 of the base 142 for storage.

For further illustration, according to the embodiments shown in FIGS. 1, 9 and 10, the invention may dispose the accommodating recess 110 on one of the first casing 100 and the support frame 14 of the display module 10. Furthermore, according to the embodiments shown in FIGS. 9 and 10, the invention may dispose the accommodating recess 110 on one of the frame body 140 and the base 142 of the support frame 14. In other words, the accommodating recess 110 may be disposed on the first casing 100 of the display module 10, the frame body 140 of the support frame 14 or the base 142 of the support frame 14 according to practical applications.

As mentioned in the above, a user may connect the protruding portion of the color calibrator to the positioning recess of the display module, so as to use the color calibrator to perform color calibration for the display area of the display module. By means of the cooperation between the protruding portion of the color calibrator and the positioning recess of the display module, the color calibrator can be positioned easily and the sensor does not tilt. After using the color calibrator, the user may accommodate the color calibrator in the accommodating recess of the display module or the support frame for storage, so as to prevent the color calibrator from being lost in storage alone. Furthermore, the invention does not need to dispose the motor of the prior art, such that the required component is less, the maintenance is more convenient, and the price is lower for the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
   a display module comprising a first casing and a circuit board, the first casing having a positioning recess and an accommodating recess, the positioning recess and the accommodating recess being located at two adjacent sides of the first casing, the circuit board having a first electrical connecting portion, the circuit board being disposed corresponding to the positioning recess and the first electrical connecting portion being exposed from the positioning recess; and
   a color calibrator comprising a second casing, a second electrical connecting portion and a sensor, a first end of the second casing having a protruding portion, the second electrical connecting portion being disposed corresponding to the protruding portion, the sensor being disposed at a second end of the second casing and electrically connected to the second electrical connecting portion;
   wherein the color calibrator is selectively accommodated in the accommodating recess or connected to the positioning recess by the protruding portion; when the protruding portion of the color calibrator is connected to the positioning recess, the first electrical connecting portion is electrically connected to the second electrical connecting portion and the sensor faces a display area of the display module.

2. The display device of claim 1, wherein the first end and the second end form an L-shape.

3. The display device of claim 1, wherein the display module further comprises a first magnetic member, the first magnetic member is disposed corresponding to the positioning recess, the color calibrator further comprises a second magnetic member, the second magnetic member is disposed corresponding to the protruding portion; when the protruding portion of the color calibrator is connected to the positioning recess, the first magnetic member and the second magnetic member attract each other.

4. The display device of claim 3, wherein the accommodating recess has a third magnetic member; when the color calibrator is accommodated in the accommodating recess, the third magnetic member and the second magnetic member attract each other.

5. The display device of claim 1, wherein the color calibrator further comprises a light emitting unit, the light emitting unit is disposed in the second casing and electrically connected to the second electrical connecting portion, the second casing has a light transmissive portion; when the first electrical connecting portion is electrically connected to the second electrical connecting portion, the light emitting unit emits a light and the light is projected out of the second casing through the light transmissive portion.

6. The display device of claim 1, wherein the display module further comprises a cover configured to cover the positioning recess.

7. A display device comprising:
   a display module comprising a first casing and a circuit board, the first casing having a positioning recess, the circuit board having a first electrical connecting portion, the circuit board being disposed corresponding to the positioning recess and the first electrical connecting portion being exposed from the positioning recess;
   a support frame connected to the display module, one of the first casing and the support frame having an accommodating recess; and
   a color calibrator comprising a second casing, a second electrical connecting portion and a sensor, a first end of the second casing having a protruding portion, the second electrical connecting portion being disposed corresponding to the protruding portion, the sensor being disposed at a second end of the second casing and electrically connected to the second electrical connecting portion;
   wherein the color calibrator is selectively accommodated in the accommodating recess or connected to the positioning recess by the protruding portion; when the protruding portion of the color calibrator is connected to the positioning recess, the first electrical connecting portion is electrically connected to the second electrical connecting portion and the sensor faces a display area of the display module.

8. The display device of claim 7, wherein the first casing has the accommodating recess, the positioning recess and the accommodating recess are located at two adjacent sides of the first casing.

9. The display device of claim 7, wherein the support frame comprises a frame body and a base, one of the frame body and the base has the accommodating recess.

10. The display device of claim 7, wherein the first end and the second end form an L-shape.

11. The display device of claim 7, wherein the display module further comprises a first magnetic member, the first magnetic member is disposed corresponding to the positioning recess, the color calibrator further comprises a second magnetic member, the second magnetic member is disposed corresponding to the protruding portion; when the protruding portion of the color calibrator is connected to the positioning recess, the first magnetic member and the second magnetic member attract each other.

12. The display device of claim 11, wherein the accommodating recess has a third magnetic member; when the color calibrator is accommodated in the accommodating recess, the third magnetic member and the second magnetic member attract each other.

13. The display device of claim 7, wherein the color calibrator further comprises a light emitting unit, the light emitting unit is disposed in the second casing and electrically connected to the second electrical connecting portion, the second casing has a light transmissive portion; when the first electrical connecting portion is electrically connected to the second electrical connecting portion, the light emitting unit emits a light and the light is projected out of the second casing through the light transmissive portion.

14. The display device of claim 7, wherein the display module further comprises a cover configured to cover the positioning recess.

* * * * *